United States Patent [19]

Fell et al.

[11] Patent Number: 4,617,786

[45] Date of Patent: Oct. 21, 1986

[54] FORAGE HARVESTER HAVING SUPPLEMENTAL CROP DISINTEGRATING MEANS

[75] Inventors: Ferol S. Fell, Newton; Howard J. Ratzlaff, Hesston, both of Kans.

[73] Assignee: Hesston Corporation, Hesston, Kans.

[21] Appl. No.: 641,049

[22] Filed: Aug. 15, 1984

[51] Int. Cl.⁴ ............................................ A01D 45/02
[52] U.S. Cl. .................................. 56/13.4; 241/101.7; 241/222; 56/320.2
[58] Field of Search ................... 56/13.3, 13.4, 320.1, 56/320.2, 500; 241/101.7, 222

[56] References Cited

U.S. PATENT DOCUMENTS

| | | | |
|---|---|---|---|
| 2,554,071 | 5/1951 | Strawn | 241/189 R |
| 3,521,687 | 7/1970 | Gaeddert | 241/101.7 |
| 3,566,943 | 3/1971 | Witt | 241/222 |
| 3,610,544 | 10/1971 | O'Connor | 241/189 R |
| 3,708,129 | 1/1973 | Nowak | 241/189 R |
| 4,302,878 | 12/1981 | Bonforte | 56/295 |
| 4,345,417 | 8/1982 | deBuhr et al. | 56/14.3 |

OTHER PUBLICATIONS

Claas Sales Brochure "Jaguar 690/680/675, coded 1/84 (Rho) 150/190,035,0.

Primary Examiner—Gene Mancene
Assistant Examiner—David I. Tarnoff
Attorney, Agent, or Firm—Schmidt, Johnson, Hovey & Williams

[57] ABSTRACT

A high speed rotor in the chute of a forage harvester is used to crack kernels in chopped forage impelled to the rotor. The rotor itself has four or more rows of elongated, spaced-apart plates provided with blunt cracking edges, and a deflector, disposed upstream of the rotor, is adjustable for a wide range of positions and diverts the flow of material to allow control over the degree of cracking.

5 Claims, 5 Drawing Figures

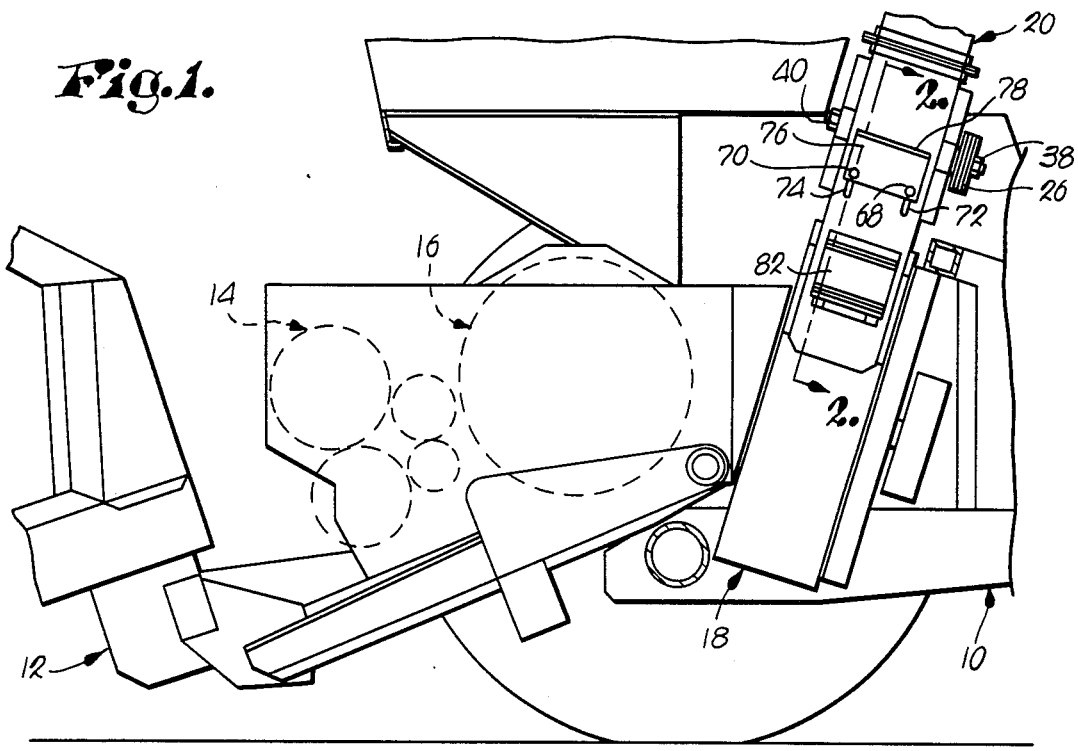
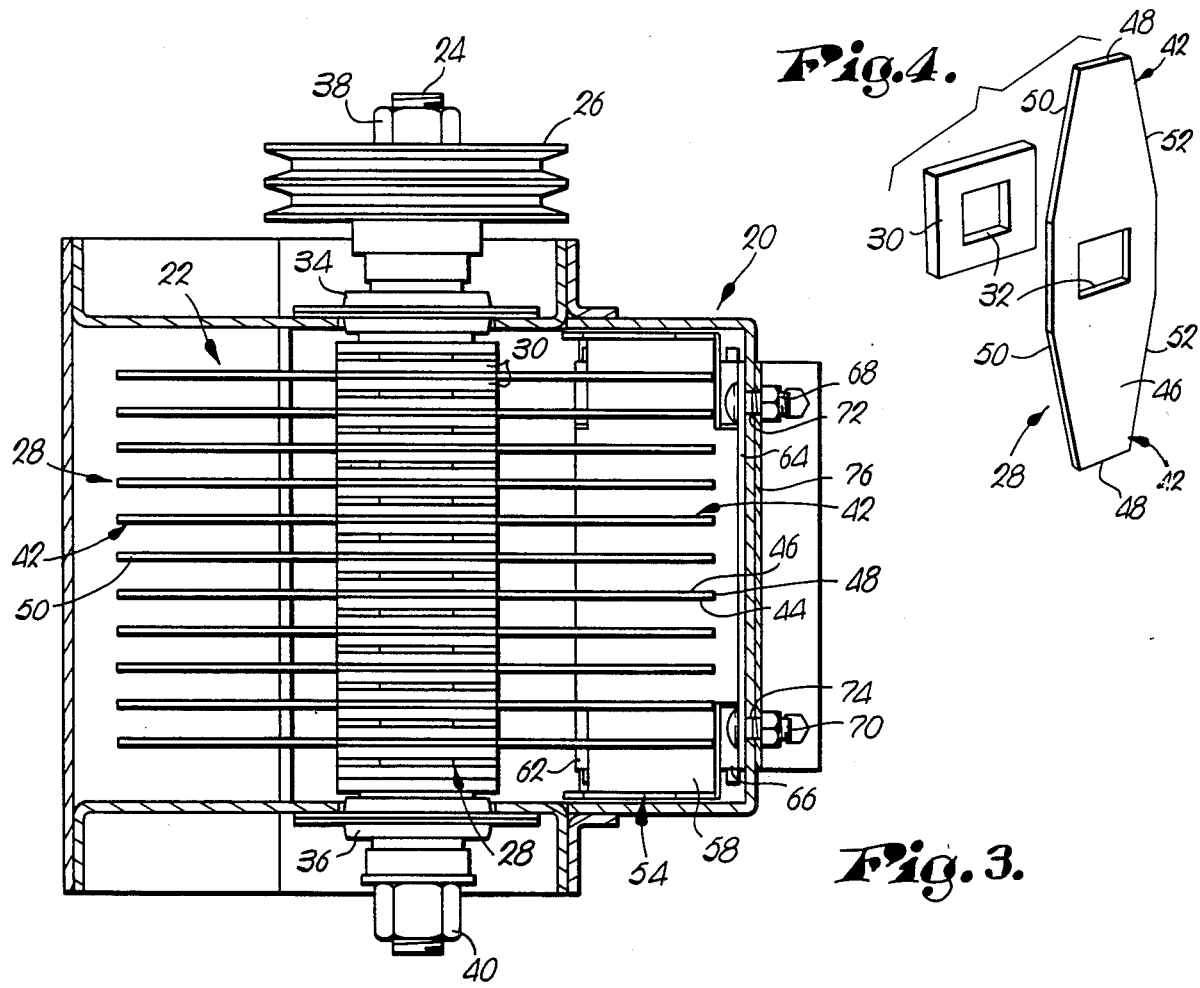

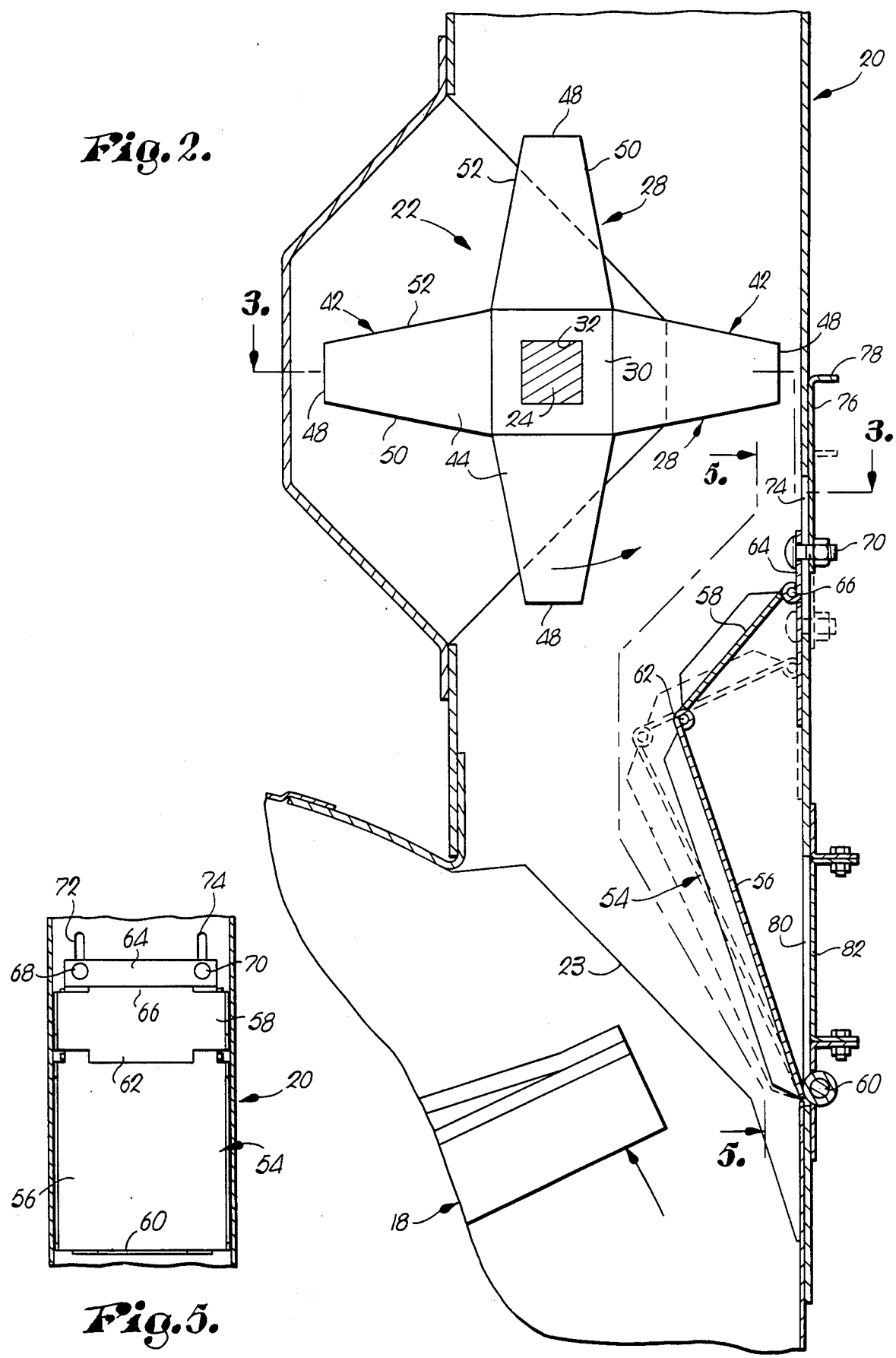

FORAGE HARVESTER HAVING SUPPLEMENTAL CROP DISINTEGRATING MEANS

BACKGROUND OF THE INVENTION

1. Field of the Invention

Our present invention relates to kernel cracking for forage harvesters.

2. Description of the Prior Art

Forage harvesters today commonly utilize a crop header, a feed roll assembly, a rotatable cutter, and a discharge means, usually a blower, although in some instances the cutter itself may also be utilized as the discharge means without the blower. As the implement advances in the field, the header gathers the standing crop and severs the latter from its roots. The header than delivers the cut plant to the feed roll assembly, which uniformly advances the crop to the cutter, having blades that normally cooperate with a stationary knife. The blades chop the forage into relatively small fragments, and the latter are then propelled through a chute into a container.

In order to provide a more palatable and digestible feed, much effort in the past has been directed toward cracking the hulls of the kernels, particularly on corn plants. One method often used has been a recutter screen fitted close to the proximity of the rotating blades having a plurality of openings which retard the flow of material and cause the same to be recut. Some recutters have been equipped with stationary knives around the openings which cooperate with the blades. However, these screens have been known to cause a multitude of problems. Recutters dull easily, are difficult to remove and install, and demand arduous resharpening. Furthermore, although the forage may become finely ground, the kernels often pass through the screen uncracked. Also, use of these devices increases the power requirement of the cutter substantially.

In an attempt to overcome these disadvantages, some harvestors have employed crushing rollers of various configurations, located downstream of the cutter. However, the use of compressor rolls requires a substantial framework to brace the assembly. Also, the rolls are difficult to install and require a considerable amount of space.

SUMMARY OF THE INVENTION

According to our present invention, a high speed rotor having a series of spaced-apart plates is used in the chute to crack kernels. The rotor is located downstream of a cutter, blower and deflector assembly. After the cutter chops the forage, the blower propels the crop toward an adjustable deflector, which directs the materials toward the rotor. The kernels impact against the edges of the rotor plates and are cracked. In our preferred embodiment, the rotor has elements that integrally form a pair of plates. Each element is offset ninety degrees from the neighboring element, resulting in four parallel rows of plates. The plates have a straight outer end at their peripheries and two edges that converge as their terminal ends are approached. This trapezoidal shape has been found to produce the most thorough kernel crackage.

As a result, our kernel processing means is simple, compact and effective. Because the kernels are impacted by the blunt edges of the rotor plates, there are no knife edges which may dull and require resharpening. The blunt edges also tend to ensure that the hulls on the kernels are merely cracked, and not broken into extremely small fines, which could cause digestive problems and reduced feed utilization.

Additionally, our kernel cracker is lightweight, inexpensive, and may easily be retrofitted to many harvesters in use. Elaborate structural reinforcement, as is necessary with the use of crushing rolls, is not required. The rotor assembly may readily be removed from the chute when the forage harvester is used in crops such as hay. Power requirements are less than with recutter assemblies.

The deflector may be field-adjusted to give the operator complete control over the percentage of kernels to be cracked. Alternatively, the assembly may be pulled completely out of the path of the traveling materials. The configuration of both the deflector and the rotor while in use tend to inhibit the accumulation of chopped forage.

In the Drawing

FIG. 1 is a fragmentary, side elevational view of a forage harvester having supplemental crop disintegrating means made pursuant to our present invention;

FIG. 2 is an enlarged, longitudinal cross-sectional view taken along lines 2—2 of FIG. 1;

FIG. 3 is a transverse cross-sectional view taken along line 3—3 of FIG. 2;

FIG. 4 is an exploded view of a cracking element and a spacer of the cracking rotor; and FIG. 5 is a fragmentary, detailed cross-sectional view taken along line 5—5 of FIG. 2.

DESCRIPTION OF THE PREFERRED EMBODIMENT

A forage harvester, as shown in FIG. 1, includes a mobile main frame 10, a crop header 12, a feed roll assembly 14, a rotatable cutter 16, and a blower 18 (FIG. 2). Header 12 may take the form of any suitable type, such as the units described in U.S. Pat. No. 3,388,538, issued June 18, 1968. Similarly, cylinder 16 may be substantially the same as disclosed in U.S. Pat. No. 4,301,647, issued Nov. 24, 1981.

Referring to FIG. 2, an elongated, generally upright chute 20 has an internal rotor assembly 22. The chute 20 is transversely rectangular and has an enlarged cross-section in an area near the rotor 22. Outlet 23 of the blower 18 communicates with the chute 20.

The rotor 22 includes an elongated, transversely polygonal shaft 24 and a drive sheave 26. A plurality of identical cracking elements 28 are received on the shaft 24 and extend radially outward from the latter, and spacers 30 separate the elements 28. Each of the elements 28 and the spacers 30 has a square, central bore 32 mating with the shaft 24. Shaft bearings 34 and 36 have flanged housings engaging the chute 20, and nuts 38 and 40 releasably clamp the sheave 26, the elements 28, the spacers 30 and the bearings 34 and 36 to the shaft 24.

Each element 28 is provided with a pair of diametrically opposed, elongated, integrally interconnected plates 42, each having a pair of opposite faces 44 and 46, a straight outer end 48 and two edges 50 and 52. The ends 46 are perpendicular to the longitudinal axes of the plates 42, and the edges 50 and 52 are perpendicular to the faces 44 and 46. In addition, the edges 50 and 52 converge as the ends 48 are approached. Each element 28 is mounted on the shaft 24 such that the longitudinal axis of each plate 42 is offset ninety degrees in relation to the same axis of the adjacent element 28. Other variations are possible, however, such that more than four rows of the rotor plates are presented.

The chute 20 also has an internal deflector assembly 54, having a flat, rectangular panel 56 and a connector 58. A hinge 60 at the upstream terminus of panel 56 is attached to the chute 20 and a hinge 62 at the downstream terminus of the panel 56 is fastened to the upstream end of connector 58. The downstream end of the connector 58 is pivotally joined to a slidable member 64 by a hinge 66. Two bolts, 68 and 70, protrude through the member 64, a pair of slots 72 and 74 in the chute 20, and through a section 76, the latter being provided with a handle 78 at its upper portion. A clean-out port 80 having a cover 82 is disposed to provide access to the area bounded by the deflector assembly 54 and the chute 20.

OPERATION

As the forage harvester advances in a field of standing crop, severance takes place adjacent the ground level and the stalks, grasses or the like are projected rearwardly from the header 12 to the assembly 14 and thence to the cutter 16 which operates, in the usual manner, to cut the material into small fragments. The blower 18 receives the fragmented forage directly from the cutter 16 and projects it upwardly along the chute 20 toward the upper end of the latter for ultimate discharge into a receiving receptacle, usually in tow behind the forage harvester or built as a part of the harvester.

It is to be noted at this juncture that, in lieu of the blower 18, the cutter 16 may be placed into direct communication with the chute 20 such that the cutter itself serves to project the fragmented material upwardly in the chute 20.

Assuming the deflector assembly 54 to be in the full line position shown in FIG. 2, the fragmented crop emanating from the blower 18 will be deflected laterally of the chute 20 and toward the rotor assembly 22 in substantial alignment with the axis of rotation of the shaft 24, sometimes slightly to the left of the shaft 24, viewing FIG. 2. This is usually quite an effective positioning of the deflector assembly 54 for most kernel-containing crops such as corn, resulting in cracking of the kernels without substantial, undesirable, additional fragmentation of the kernels.

As soon as the crop reaches the rotor 22, it is confronted by the high-speed, spinning plates 42 successively, the impact of the edges 50 and 52, as well as the ends 48 on the crop effecting the cracking of the kernels, all without substantial buildup in and around the shaft 24 near the inner ends of the plates 42. In this respect it is preferred that the tip speed of the plates 42 be on the order of twice the speed of the crops as they approach the rotor 22.

The action is such that the crop tends to move radially outwardly along the edges 50 and 52 toward the periphery of the rotor 22, and as the crop is picked up by one of the plates 42, the next succeeding plate will immediately engage the crop and carry it outwardly and upwardly along the chute 20.

While the trapezoidal configuration of the plates 42, presenting the kernel fragmenting edges 50 and 52, is deemed to be significant for optimum movement of the crop radially of the shaft 24, a rectangular configuration for the plates 42 will operate substantially as well, provided that squared-off ends 48 are utilized, as distinguished from the edges 50 and 52 terminating in a point. Also, it has been found that there should be at least four plates 42 in each pair of elements 28, as distinguished from the provision of two or three of such plates 42.

In the event the action on the kernels appears to be too severe such as to break the kernels into a multitude of small fragments, as compared with the mere cracking of the hull as is desired, the deflector assembly 54 may be adjusted such as to shift the hinge 62 to the right viewing FIG. 2, and, manifestly, when the panel 56 as well as the connector 58 are flatly against the proximal wall of the chute 20, the material flowing from the blower 18 to the outlet of the chute 20 will tend to pass through the chute 20 without substantial cracking of the kernels.

On the other hand, as the assembly 54 is adjusted to move the hinge 62 to the dotted line position in FIG. 2, the aggressiveness of the rotor 22 will increase, if such action is needed in order to effectively crack the kernels as desired.

In order to effect the adjustment of the assembly 54, the operator need merely loosen the bolts 68 and 70 and thereupon lift the section 76 by use of the handle 78, such upward movement of the section 76 operating to raise the hinge 66 and buckle the panel 56 and the connector 58 toward the wall of the chute 20 within which the slots 74 are formed. Conversely, depressing of the handle 78 operates to shift the hinge 62 toward the dotted line position shown in FIG. 2, all by virtue of the action of the three hinges 60, 62 and 66.

It can now be appreciated that the action of the cracking rotor 22 in conjunction with the chute 20 and the blower 18 or the like is to be preferred over other cracking assemblies heretofore suggested, such as crushing rolls, which in addition to being heavy, expensive and not easily maintained, may produce or tend to produce a smashing action on the kernels rather than the more desirable effect of simply breaking open the hard hull of the kernel such as to be appreciably more attractive to animals when the forage crop is produced as a feed product.

While not hereinabove fully described, it is to be preferred that the entire rotor assembly 22 be mounted in and supported by the chute 20 such that it can be quickly and easily removed when its use is not desired or when the assembly 22 is in need of repair of other attention. For example, in the event the forage harvester is to be used in the harvesting of grasses or other crops not containing kernels to be cracked, it may be desirable to entirely remove the assembly 22 such as to provide free full clearance of the crop through the chute 20 with the assembly 54 fully retracted.

We claim:

1. In an implement for harvesting forage of the kind having kernels, the combination of:
   means for cutting the standing forage;
   means for chopping the cut forage;
   an enlongated, generally upright chute disposed to receive the chopped forage at the lower end of the chute for continuous projection of the forage in a stream with substantial velocity along the chute and discharge at the upper end of the latter;
   a rotor in said chute for cracking said kernels as the chopped forage is projected through the chute,
   said rotor including:
   an elongated shaft,
   means supporting the shaft for rotation about its longitudinal axis, and a plurality of cracking elements carried by the shaft for rotation therewith, said elements being spaced apart along the shaft, each element having a number of elongated plates spaced circumferentially of the rotor and extending radially outwardly from the shaft, each plate having a pair of opposed, flat faces, and a relatively thin, kernel-engaging, leading edge with respect to the overall length of the rotor, each plate terminating in an elongated outer end remote from the shaft; and means for spinning said rotor at a speed substantially in excess of the velocity of the stream prior to reaching the rotor, said chute being provided with deflecting means therein between said lower end of the chute and the rotor, said deflecting means being movable to and from a position diverting the stream laterally of the chute.

2. The invention of claim 1, said deflecting means including a panel swingable to and from any one of a number of preselected, inclined positions for directing the steam to the rotor at any one of a number of locations onto the rotor between its axis of rotation and the periphery thereof spaced radially outwardly of said axis.

3. The invention of claim 2, said panel being rectangular, parallel to said axis of rotation, and having an upstream and a downstream terminus; means at said upstream terminus swingably connecting the panel to said chute; and releasable means for holding the panel in a preselected position.

4. The invention of claim 3; and a connector in the chute pivotally attached to the panel at said downstream terminus, said releasable means being a slide member having a pivotal joinder with the connector and releasable fasteners coupling the member to the chute.

5. The invention of claim 4, there being hinges connecting the panel to the chute, attaching the connector to the panel and joining the connector to the member.

* * * * *